US010863379B2

(12) United States Patent
Pandey et al.

(10) Patent No.: US 10,863,379 B2
(45) Date of Patent: Dec. 8, 2020

(54) BSS COLOR ASSIGNMENT IN INFRASTRUCTURE WLANS

(71) Applicant: Cisco Technology, Inc., San Jose, CA (US)

(72) Inventors: Santosh Ghanshyam Pandey, Fremont, CA (US); Pooya Monajemi, San Francisco, CA (US); Vishal Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/505,105

(22) Filed: Jul. 8, 2019

(65) Prior Publication Data

US 2019/0335354 A1 Oct. 31, 2019

Related U.S. Application Data

(63) Continuation of application No. 15/791,438, filed on Oct. 24, 2017, now Pat. No. 10,412,617.

(51) Int. Cl.

*H04L 12/26* (2006.01)
*H04W 28/02* (2009.01)
*H04W 24/02* (2009.01)
*H04W 84/12* (2009.01)

(52) U.S. Cl.

CPC ....... *H04W 28/0252* (2013.01); *H04W 24/02* (2013.01); *H04W 28/0231* (2013.01); *H04W 84/12* (2013.01)

(58) Field of Classification Search

CPC ............. H04W 28/0252; H04W 24/02; H04W 28/0231; H04W 84/12

See application file for complete search history.

(56) References Cited

U.S. PATENT DOCUMENTS

| | | | |
|---|---|---|---|
| 2015/0358884 | A1 | 12/2015 | Nagasaka et al. |
| 2016/0345258 | A1 | 11/2016 | Zhou et al. |
| 2017/0085461 | A1 | 3/2017 | Zhou et al. |
| 2017/0223616 | A1 | 8/2017 | Hwang et al. |
| 2017/0359300 | A1 | 12/2017 | Patil et al. |
| 2018/0184428 | A1 | 6/2018 | Cariou et al. |
| 2019/0124542 | A1 | 4/2019 | Pandey et al. |

OTHER PUBLICATIONS

Zheng, et al., “Performance Analysis for Resource Coordination in a High-Density Wireless Environment,” 2008 IEEE Symposium on Computers and Communications, Jul. 2008, 6 pages.

Liu, et al., “Aid Assign Rule Based on BSS Color and He Operation Element,” IEEE 802.11-16/0364r1, XP055365823, Mar. 2016, 19 pages.

*Primary Examiner* — Minh Trang T Nguyen

(57) ABSTRACT

In one embodiment, a basic service set (BSS) color assignment apparatus includes a processor, and a memory to store data used by the processor, wherein the processor is operative to calculate, for each one BSS color of a plurality of BSS colors, a BSS color assignment metric at least based on use of the one BSS color in at least one neighboring BSS neighboring a BSS of an access point in an infrastructure wireless local area network (WLAN), yielding a plurality of BSS color assignment metrics for the BSS of the access point, select one of the plurality of BSS color assignment metrics associated with an optimal choice BSS color of the plurality of BSS colors for the BSS of the access point and assign the optimal choice BSS color to the BSS of the access point.

20 Claims, 3 Drawing Sheets

10
WIRELESS LAN CONTROLLER UNIT
MEMORY
22
20
PROCESSOR
24
INTERFACE
26
18
18
12-1
12-2
BSS
BSS
16-2
16-1
16-3
OBSS
14
12-3

28
30
RECEIVE DATA FROM BSSs
32
CALCULATE A BSS COLOR ASSIGNMENT METRIC FOR EACH COLOR FOR AN ACCESS POINT
34
SELECT LOWEST (OR HIGHEST) METRIC AND ASSIGN OPTIMAL COLOR
40
NEXT ACCESS POINT
36
MORE ACCESS POINTS?
38
YES
42
NO
44
SEND DATA TO ACCESS POINTS
END

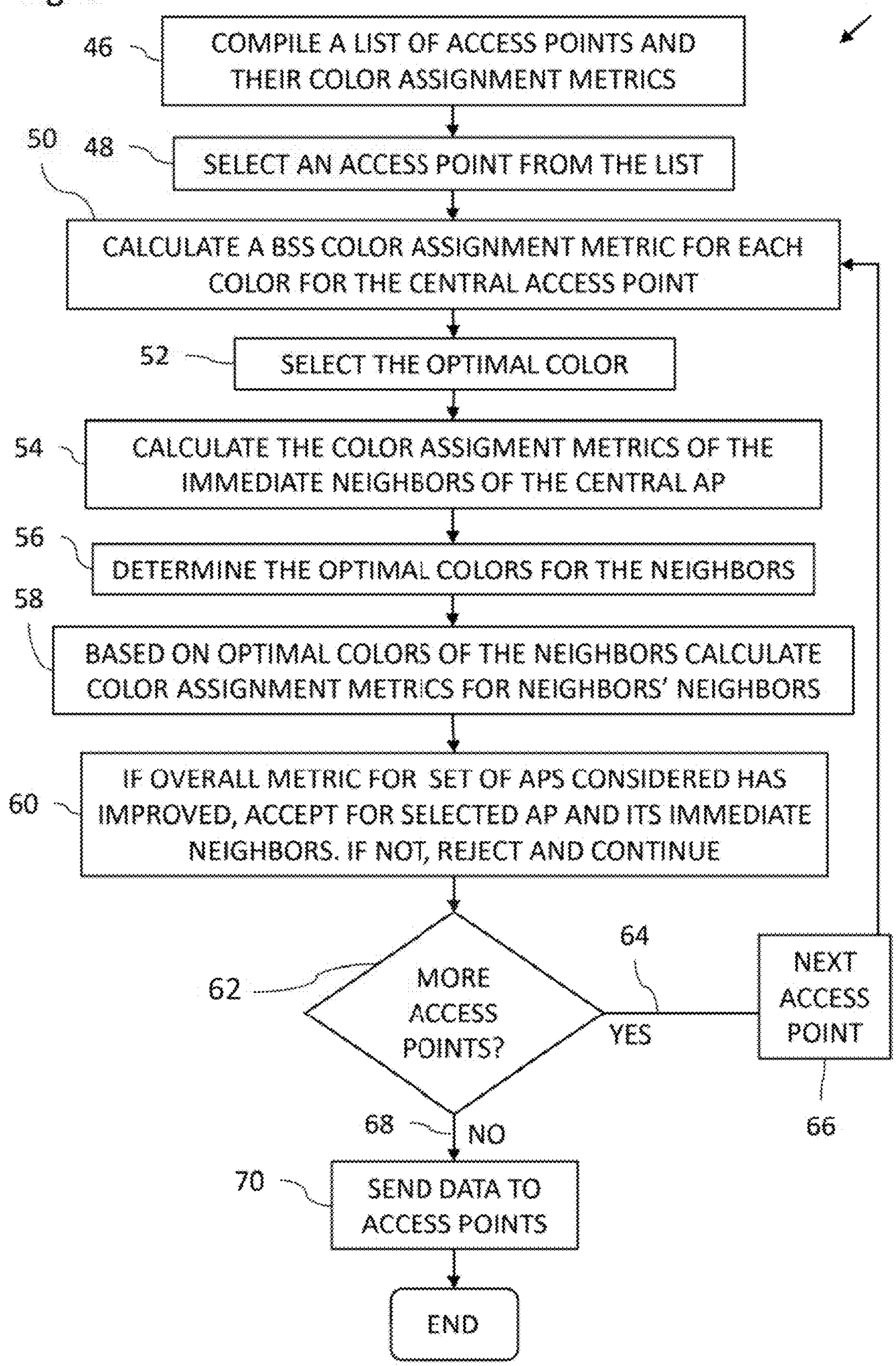
Fig. 3
45
46
COMPILE A LIST OF ACCESS POINTS AND THEIR COLOR ASSIGNMENT METRICS
50
48
SELECT AN ACCESS POINT FROM THE LIST
CALCULATE A BSS COLOR ASSIGNMENT METRIC FOR EACH COLOR FOR THE CENTRAL ACCESS POINT
52
SELECT THE OPTIMAL COLOR
54
CALCULATE THE COLOR ASSIGMENT METRICS OF THE IMMEDIATE NEIGHBORS OF THE CENTRAL AP
56
DETERMINE THE OPTIMAL COLORS FOR THE NEIGHBORS
58
BASED ON OPTIMAL COLORS OF THE NEIGHBORS CALCULATE COLOR ASSIGNMENT METRICS FOR NEIGHBORS' NEIGHBORS
60
IF OVERALL METRIC FOR SET OF APS CONSIDERED HAS IMPROVED, ACCEPT FOR SELECTED AP AND ITS IMMEDIATE NEIGHBORS. IF NOT, REJECT AND CONTINUE
62
MORE ACCESS POINTS?
64
YES
NEXT ACCESS POINT
66
68
NO
70
SEND DATA TO ACCESS POINTS
END

BSS COLOR ASSIGNMENT IN INFRASTRUCTURE WLANS

CROSS REFERENCE TO RELATED APPLICATION

This application is a continuation of U.S. application Ser. No. 15/791,438, filed Oct. 24, 2017, the entirety of which is incorporated herein by reference.

TECHNICAL FIELD

The present disclosure generally relates to basic service set (BSS) color assignment in infrastructure wireless local area networks (WLANs).

BACKGROUND

The Institute of Electrical and Electronics Engineers (IEEE) specification 802.11ax is a specification for implementing a type of wireless local area network (WLAN) in the IEEE 802.11 set of specifications. It is designed to improve overall spectral efficiency, especially in dense deployment scenarios. 802.11ax introduces a basic service set (BSS) coloring mechanism to increase capacity in high-density WLAN networks. To improve the system level performance and the efficient use of spectrum resources in dense deployment scenarios, the 802.11ax standard implements a spatial reuse technique. Stations (STAs) can identify signals from other (e.g., overlapping) BSSs and make decisions on medium contention and interference management based on this information. When an STA that is actively listening to the medium detects an 802.11ax frame, it checks the BSS color bit. If the BSS color in the detected Physical Layer Convergence Procedure (PLCP) Protocol Data Unit (PPDU) is the same color as one that an access point (AP) associated with the STA has already announced, then the STA considers the detected frame as an intra-BSS frame. However, if the detected frame has a different BSS color than its own, then the STA considers that frame as an inter-BSS frame from an overlapping BSS. Upon fulfilling overlapping BSS received energy requirements, the STA treats the medium as busy only during the time it takes the STA to validate that the detected frame is from an inter-BSS, but not longer than the time indicated as the length of the frame's payload. Optimal assignment of BSS color in these networks is a prerequisite to obtaining improved performance in such networks.

BRIEF DESCRIPTION OF THE DRAWINGS

The present disclosure will be understood and appreciated more fully from the following detailed description, taken in conjunction with the drawings in which:

FIG. 3 is a flow chart showing exemplary steps in an alternative method of operation of the wireless communication system of FIG. 1.

DESCRIPTION OF EXAMPLE EMBODIMENTS

Overview

There is provided in accordance with an embodiment of the present disclosure, a basic service set (BSS) color assignment apparatus including a processor, and a memory to store data used by the processor, wherein the processor is operative to calculate, for each one BSS color of a plurality of BSS colors, a BSS color assignment metric at least based on use of the one BSS color in at least one neighboring BSS neighboring a BSS of an access point in an infrastructure wireless local area network (WLAN), yielding a plurality of BSS color assignment metrics for the BSS of the access point, select one of the plurality of BSS color assignment metrics associated with an optimal choice BSS color of the plurality of BSS colors for the BSS of the access point, and assign the optimal choice BSS color to the BSS of the access point.

DETAILED DESCRIPTION

Figure 1:
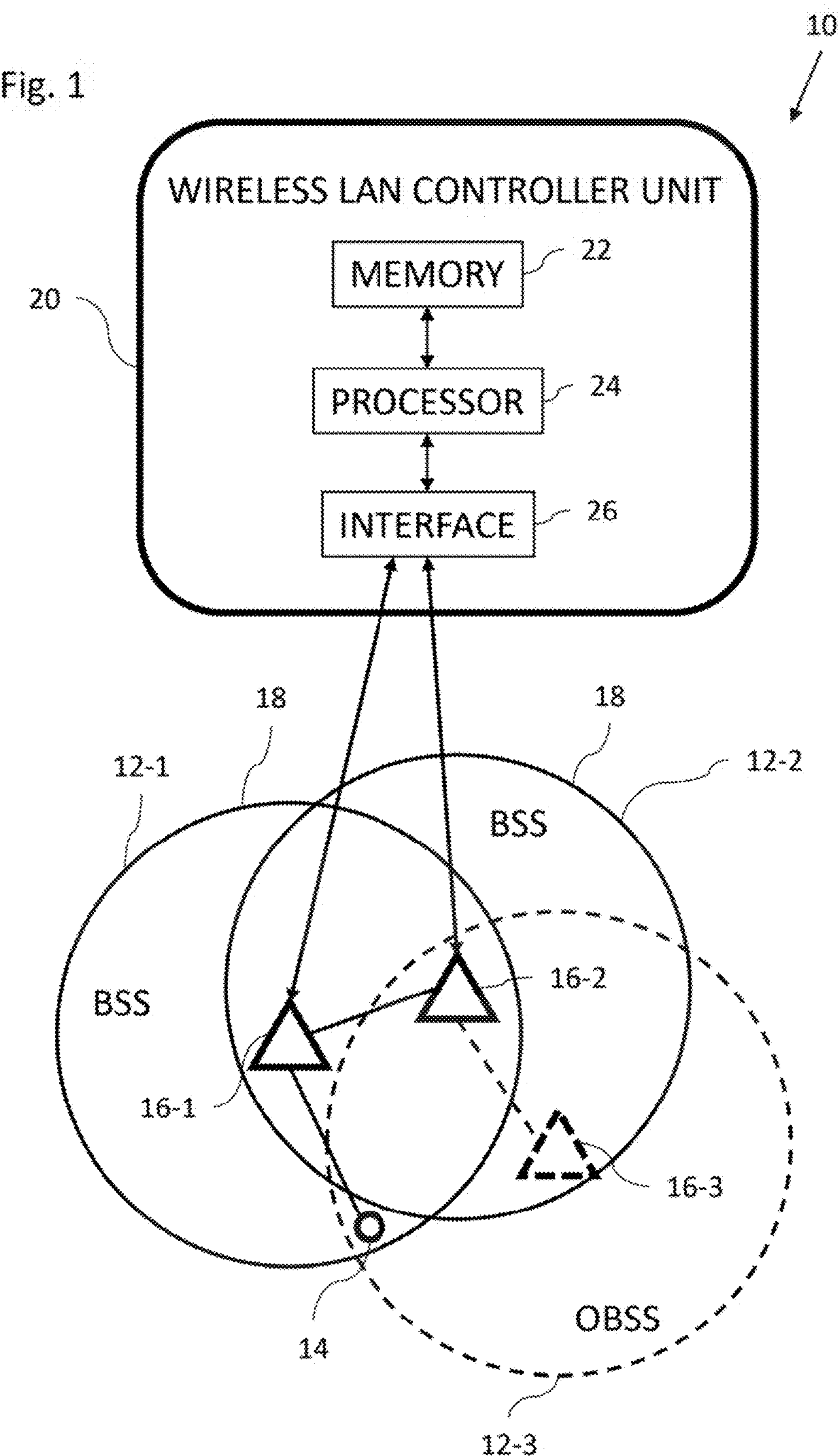
FIG. 1 is a block diagram view of a wireless communication system constructed and operative in accordance with an embodiment of the present disclosure.

Reference is now made to FIG. 1, which is a block diagram view of a wireless communication system 10 constructed and operative in accordance with an embodiment of the present disclosure. The wireless communication system 10 includes an infrastructure wireless local area network (WLAN) deployment 18 and a wireless LAN controller unit 20. FIG. 1 shows three basic service sets (BSSs) 12 including a basic service set 12-1; a basic service set 12-2; and a basic service set 12-3. BSS 12-1 and BSS 12-2 belong to the WLAN deployment 18. BSS 12-3 does not belong to the infrastructure WLAN deployment 18 of BSS 12-1 and BSS 12-2 and overlaps (geographically, in the physical space) with BSS 12-1 and BSS 12-2. BSS 12-3 is an example of an overlapping BSS (OBSS) with respect to BSS 12-1 and BSS 12-2. FIG. 1 also shows a station (STA) 14, which is part of BSS 12-1, but not part of BSS 12-2 or BSS 12-3. It will be appreciated that many STAs may be included in any of the basic service sets 12. However, only one STA has been shown for the sake of simplicity. An STA is herein defined as a device that has the capability to use the 802.11 protocol. The device may be stationary, mobile, or portable. BSS 12-1 includes an access point (AP) 16-1, BSS 12-2 includes an access point 16-2, and BSS 12-3 includes an access point 16-3. The BSS 12-3 is located such that the station 14 of BSS 12-1 and the access point 16-2 of the BSS 12-2 are able to detect signals from the access point 16-3 of BSS 12-3 even though the access point 16-1 of the BSS 12-1 cannot detect signals from the access point 16-3.

Considering BSS 12-1, many problems in BSS color assignment may arise, one of which is acquiring information about BSS colors used by neighboring BSSs 12 (e.g., BSS 12-2 and BSS 12-3). BSS colors used by neighboring BSSs 12 (e.g., BSS 12-2) may be visible to the access point 16-1 of the BSS 12-1. Other BSS colors used by neighboring BSSs 12 (e.g., BSS 12-3) may be invisible to the access point 16-1 of the BSS 12-1. Even though the access point 16-1 of BSS 12-1 cannot detect signals from the access point 16-3, the signals from the access point 16-3 may impact the devices in BSS 12-1 such as the station 14. A neighboring BSS 12 to BSS 12-1 may include any BSS 12 whose signals are detected by the AP 16-1 of BSS 12-1 or by any STA (e.g. the station 14) of the BSS 12-1. A neighboring BSS 12 to BSS 12-1 may also include any BSS 12 whose signals are detected by the AP (e.g., AP 16-2) of a BSS (e.g., BSS 12-2) visible to the access point 16-1 of the BSS 12-1. Alternatively, a neighboring BSS 12 to BSS 12-1 may include any BSS 12 whose wireless coverage area (or basic service area (BSA)) geographically overlaps with the wireless coverage area (or BSA) of BSS 12-1.

In accordance with the Institute of Electrical and Electronics Engineers (IEEE) specification 802.11ax, a BSS Color is limited to a number between 0 and 31. Therefore, in high-density environments, neighboring BSSs 12 may already be using all the available BSS color codes (at least once). Therefore, BSS color assignment may include assigning a BSS color, which is the same as a neighboring BSS. The wireless communication system 10 is therefore operative to assign a BSS color to one of the BSSs 12 (or assign BSS colors to more than one BSS 12) according to one or more criteria, which takes/take into account the use of the BSS colors in the (visible and invisible) neighboring BSSs 12 to select the optimal BSS color for the BSS 12 (or optimal colors for the BSSs 12). During the color assignment computations, the wireless communication system 10 attempts to achieve a separation of BSS colors for the BSSs 12 in the WLAN deployment 18. This separation of colors is with respect to BSS colors used, in the WLAN deployment 18 and the colors used outside the WLAN deployment 18, in order to optimize throughput performance in each BSS of the WLAN deployment 18. Color assignment computations are discussed in more detail with reference to FIG. 2.

BSS Color assignment may be performed by a wireless local area network (LAN) controller unit 20. The wireless LAN controller unit 20 includes a memory 22, a processor 24, and an interface 26. The memory 22 is operative to store data used by the processor 24. The processor 24 and the interface 26 are described in more detail with reference to FIG. 2. In accordance with an alternative embodiment of the present disclosure, the color assignment in the WLAN deployment 18 may be performed in a distributed fashion by processors disposed in a plurality of the APs 16 in the WLAN deployment 18 by way of example only.

In order to provide a separation of colors with the OBSSs not in the WLAN deployment 18, information about the OBSSs is obtained and provided to the wireless LAN controller unit 20 and/or other APs 16 in the WLAN deployment 18. For example, in the scenario described above, the BSS 12-1 has no information about the BSS 12-3, which, as mentioned above is an OBSS, and the lack of information may result in suboptimal color assignment. To mitigate this problem, the BSS 12-2, a neighbor of the BSS 12-1, is operative to scan its neighborhood and obtain information about OBSS sets that it can detect, including their colors. This information is then reported back in at least one of two possible methods, which may include the BSS 12-2 transmitting proprietary Neighbor Discovery Packets to BSS 12-1 that include information about detected OBSSs and/or BSS 12-2 transmitting the detected OBSS information to the wireless LAN controller unit 20.

Figure 2:
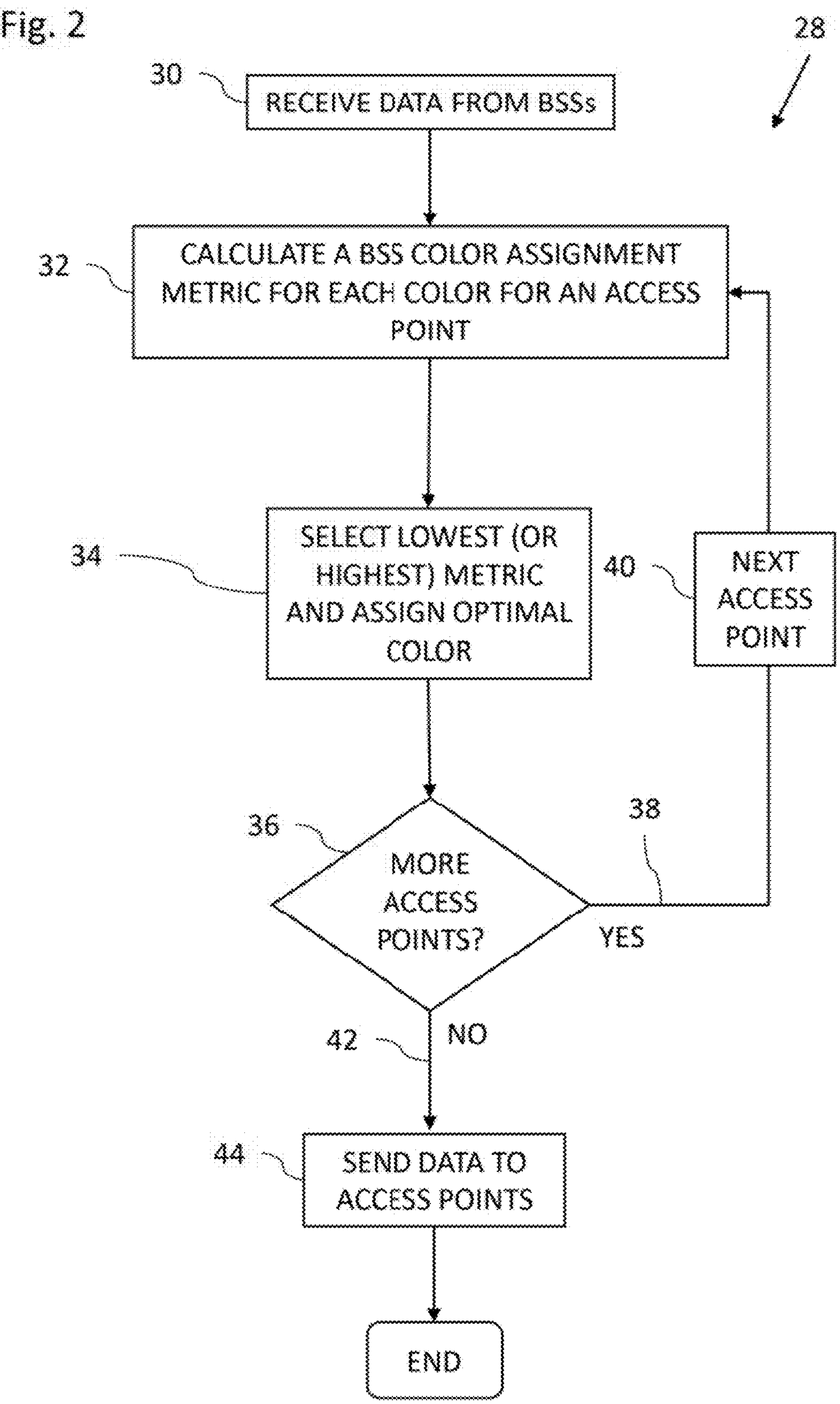
FIG. 2 is a flow chart showing exemplary steps in a method of operation of the wireless communication system of FIG. 1.

Reference is now made to FIG. 2, which is a flow chart 28 showing exemplary steps in a method of operation of the wireless communication system 10 of FIG. 1. Reference is also made to FIG. 1. Exemplary steps in determining BSS color assignment for the access points 16 in the WLAN deployment 18 are now described. The method is described based on the method being performed centrally in the wireless LAN controller unit 20 for each of the access points 16. It will be appreciated that the method may be performed in a distributed fashion among some, or all, of the access points 16 with appropriate changes to the method described below.

The access points 16 in the WLAN deployment 18 are operative to detect traffic from neighboring BSSs and OBSSs and report data about the traffic to the wireless LAN controller unit 20. It will be appreciated that when the BSS colors are computed in a distributed fashion, the data may be reported by the access points 16 (e.g., access point 16-2) to neighboring access points 16 (e.g., access point 16-1) for distributed BSS color computation. The data reported back to the wireless LAN controller unit 20 (and/or to the access points 16 (e.g., the access point 16-1)) is described in more detail below.

The interface 26 is operative to receive (block 30) data from a plurality of the BSSs 12 (e.g., access points 16) in the WLAN deployment 18. The data may include one or more of the following: (i) BSS load of neighboring BSSs and/or OBSSs, (ii) estimated and/or detected neighboring relative received signal strength (RSSI) of neighboring BSSs and/or OBSSs, (iii) channels being used by neighboring BSSs and/or OBSSs, (iv) whether detected traffic is from a neighboring BSS or OBSS, (v) how many 802.11ax client devices versus non-802.11ax client devices a neighboring BSS and/or OBSS has. Each of the preceding data items is subdivided by BSS color. So for example, BSS load sent by one of the access points 16 may include: BSS load of at least one neighbor of that access point 16 for color 1; and/or BSS load of at least one neighbor of that access point 16 for color 2. By way of example, the interface 26 may be operative to receive data from the BSS 12-2 (which is different from the BSS 12-1 of the access point 16-1), about the use of one BSS color (or more than one BSS color) in the neighboring BSS 12-3, which is an overlapping BSS 12.

For each access point 16 (e.g., access point 16-1, and access point 16-2) of the WLAN deployment 18, a BSS color assignment metric is calculated for each color using the following formula:

C_1×[neighboring BSS load]+C_2× [neighboring RSSI]+ C_3× [channel match factor]+C_4× [inertia factor] where C_1, C_3 and C_4 are generally constants and C_2 may be a threshold related value described in more detail below.

For the sake of clarity, it should be noted that the above BSS color assignment metric is calculated for a particular BSS color for a particular access point 16. The calculation is then repeated for other available colors for the same access point. The calculation is then repeated for the other access points for each of the colors as will be described below in more detail.

By way of example, the BSS color assignment metric may be calculated for BSS color 0 for access point 16-1 of BSS 12-1 as follows: C_1× [BSS load of the neighbors of the BSS 12-1 using color 0]+C_2× [estimated or determined RSSI of the neighbors of BSS 12-1 using color 0]+C_3× [channel match factor between the channels used by the access point 16-1 and the channels used by the neighbors of BSS 12-1 using color 0]+C_4 [inertia factor of color 0]. The data used in the above formula may be provided by the access point 16-1 or by a neighboring access point 16 of the access point 16-1 such as the access point 16-2, by way of example only. It should also be noted that the data used in the above formula may include visible and/or invisible neighbors of the access point 16-1.

The terms of the above formula are described in more detail below. C_1, C_3 and C_4 are constants. It will be appreciated that the values of C_1, C_3, and C_4 may be set to any suitable value thereby giving different importance to the different terms of the formula. It will be appreciated that giving different importance to the different terms of the formula may be implementation dependent.

The "neighboring BSS load" may be measured by the access point 16-1 and/or a neighbor of the access point 16-1 such as access point 16-2. BSS load may be measured through on-channel sensing or off-channel scanning, by way of example only. The BSS load information may include information indicating a number of STAs associated with a specific BSS or a usage level of a channel, by way of example only. For example, if a neighbor is using color 0, but the BSS load of the neighbor using color 0 does not indicate that the neighbor is very active, then using color 0 by the access point 16-1 may be acceptable depending on other factors used in the formula. The neighboring BSS load is summed over all neighbors of the access point 16-1 under consideration, so that the BSS load is the BSS load of all the neighbors of the access point 16-1 under consideration using the color under consideration.

In telecommunications, RSSI is a measurement of the power present in a received radio signal. In an IEEE 802.11 system, RSSI is the relative received signal strength in a wireless environment, in arbitrary units. RSSI is an indication of the power level being received by the receive radio after the antenna and possible cable loss. Therefore, the higher the RSSI number, the stronger the signal. Thus, when an RSSI value is represented in a negative form (e.g., −100), the closer the value is to 0, the stronger the received signal has been. The "neighboring RSSI" may be measured and/or estimated by the access point 16-1 and/or a neighbor of the access point 16-1 such as access point 16-2. RSSI provides a measure of how closely BSSs are located. So for example, allocating the same BSS color to two neighboring access points 16 may be acceptable if the access points 16 are far enough apart, depending on other factors used in the formula. In order to avoid negative bias for a weaker BSS (including OBSS), the value C_2 may be a variable threshold. The value of C_2 may change based on the neighbor's signal quality, thus enabling a scheme to add positive bias towards a stronger neighbor (or neighbors) potentially contributing to higher wireless co-channel contention. So for example, if sum of path loss for (derived) RSSI is weaker than the access point's cell edge boundary (in decibel-milliwatts (dBm)) then C 2 may be set to zero. The neighboring RSSI is also summed over all neighbors of the access point 16-1 under consideration, so that the neighboring RSSI is the RSSI of all the neighbors of the access point 16-1 under consideration using the color under consideration.

The "channel match factor" provides a measure of similarity between the channels used by the access point 16-1 and the channels used by the neighbors of the access point 16-1 for the same color. So for example, the channel match factor may be set to 1 if the neighbor, or neighbors, uses/use the same primary channel or channels or frequencies as the access point 16-1 under consideration and maybe set to 0 if the access point 16-1 and the neighbor(s) operate on completely non-overlapping channels or frequencies. If there is some overlap of channels then the value may be somewhere between 0 and 1. The channel match factor is also summed over all neighbors. So for example, if three neighbors use the same primary channels as the access point 16-1 under consideration for the color under consideration, the channel match factor would be equal to 3.

The "inertia factor" is used in the formula to prevent BSS colors being changed too frequently. Therefore, the "inertia factor" may be set to zero for the current BSS color used by the access point 16-1 and set to one (or other suitable value) for any other BSS color, by way of example only.

It will be appreciated that the terms shown in the formula above are given by way of example only. Other terms may be included in the formula and one or more of the terms shown in the above formula may be omitted. Other optional terms may include: a measure for whether or not the neighbor is a BSS in the WLAN deployment 18 or an OBSS outside the WLAN deployment 18; and/or how many 802.11ax client devices versus non-802.11ax client devices a neighboring BSS has, and so forth.

Determination of an optimal BSS color for one of the access points 16, e.g., the access point 16-1 is now described. The access point for which this determination is being made is described below as the access point "under consideration".

Therefore, the processor 24 is operative to calculate (block 32), for each BSS color, a BSS color assignment metric at least based on use of that BSS color in at least one neighboring BSS 12, which neighbors a BSS 12 of one of the access points 16 (under consideration) in the infrastructure WLAN deployment 18, yielding a plurality of BSS color assignment metrics for the BSS 12 of that access point 16 (under consideration).

The step of block 32 is now described in more detail. For one of the access points 16, for each BSS color, the processor 24 is operative to calculate the BSS color assignment metric based on one or more of the following: (a) a BSS load of at least one neighboring BSS 12, which is using that BSS color; (b) an RSSI or an estimated RSSI of the neighboring BSS/BSSs 12, which is/are using that BSS color; (c) whether a channel used by the neighboring BSS/BSSs 12, which is/are using that BSS color, is the same, or different from, a channel used by the BSS 12 of that access point 16; and (d) an inertia factor, which biases against a change in the BSS color of that access point 16.

In accordance with the example given above, for the BSS color assignment metrics associated with the access point 16 under consideration, the processor 24 is operative to select (block 34) a lowest BSS color assignment metric of the plurality of BSS color assignment metrics. The lowest BSS color assignment metric is associated with an optimal choice BSS color of the plurality of BSS colors for the BSS 12 of the access point 16 under consideration. In accordance with an alternative embodiment, for example, where the formula for calculating the BSS assignment metric is structured differently, the processor 24 is operative to select a highest BSS color assignment metric of the plurality of BSS color assignment metrics associated with an optimal choice BSS color of the plurality of BSS colors for the BSS 12 of the access point under consideration. The processor 24 is operative to assign the optimal choice BSS color to the BSS 12 of the access point 16 under consideration.

The processor 24 is operative to check (block 36) if there are more access points 16 for which to perform the BSS color assignment metric calculation. If there are more access points 16 for which to perform the BSS color assignment metric calculation (branch 38), a next access point 16 is selected (block 40) and the step of block 32 is repeated for the selected access point 16. If there are no more access points 16 for which to perform the BSS color assignment metric calculation (branch 42), the next step in the method is performed. The interface 26 is operative, for each access point 16, to send (block 44) data about the optimal choice BSS color of that access point 16 to that access point 16. The step of block 44 may be performed separately for the data of each access point 16, for example, after the RSS color for each access point 16 is determined. It will be appreciated that the BSS color assignment metric calculations may be performed in batch for some, or all, of the access points 16 in the WLAN deployment 18 as described above or the BSS color assignment metric calculations may be performed for one or more of the access points 16 as relevant data for performing the BSS color assignment metric calculations is received by the wireless LAN controller unit 20.

It will be appreciated that the BSS color assignment metrics may be recalculated on a periodic basis, e.g., hourly, daily etc., or trigger based, e.g., when a certain number of new access points 16 are added to the WLAN deployment 18 or when existing access points 16 are relocated or when new access points outside of the WLAN deployment 18 are detected.

FIG. 3 is a flow chart showing exemplary steps in an alternative method 45 of operation of the wireless communication system 10 of FIG. 1. Reference is also made to FIG. 1. The processor 24 is operative to compile (block 46) a list of the access points 16 in the WLAN deployment 18. The processor 24 sorts the list according to the color assignment metric of the color selected for each of the access points 16 with the highest metric at the top of the list. Access points without a color assignment metric may be placed at any suitable point in the list, e.g., the top or bottom of the list. If metrics have not yet been assigned to the access points 16, the list may be sorted based on any suitable factor, e.g., location, date of installation. Alternatively, the method of FIG. 2 may be used to assign metrics to the access points 16 or any other suitable method if metrics have not been assigned to any or all of the access points 16 in the list. The processor 24 is operative to select (block 48) the access point 16 at the top of the list, with the highest metric or select a first access point 16 in the list that has not yet been assigned a color. This selected access point 16 will be referred to herein below as the "central access point 16".

The processor 24 is operative to calculate (block 50) a BSS color assignment metric for each color for the central access point 16. The method for calculating the BSS color assignment metric may be based on step 32 of FIG. 2 or any other suitable method taking into account basic service sets 12 in the WLAN deployment 18 as well as OBSS(s). The processor 24 is operative to select (block 52) the optimal color for the central access point 16. The optimal color is typically the color with the lowest BSS color assignment metric. The processor 24 is then operative to calculate (block 54) the color assignment metrics for all immediate neighboring access points 16 of the central access point 16 based on the optimal color newly determined for the central access point 16. The method for calculating the BSS color assignment metric for the neighboring access points 16 may be based on step 32 of FIG. 2 or any other suitable method taking into account basic service sets 12 in the WLAN deployment 18 as well as OBSS(s). The processor 24 is then operative to determine (block 56) the optimal color for each of the neighboring access points 16 based on the BSS color assignment metrics calculated in the step of block 54. The lowest BSS color assignment metric of each neighbor may be used to select the optimal color for the access points 16 of that neighbor. Based on the optimal colors of the neighboring access point 16 determined in the step of block 56 as well as the colors of other possible neighbors, the processor 24 is operative to calculate (block 58) color assignment metrics for the neighboring access points 16 of the neighboring access point 16 of the central access point 16 taking into account basic service sets 12 in the WLAN deployment 18 as well as OBSS(s). The lowest BSS color assignment metric of the neighbors' neighbors may be used to select the optimal color for the access points 16 of the neighbors' neighbors. The processor 24 is operative to evaluate (block 60) if the overall BSS color assignment metric (i.e. the sum of the BSS color assignment metrics of the optimal colors) for the set of access points 16 considered above (i.e. the BSS color assignment metric of the optimal color of the central access point 16, the neighboring access point 16 of the central access point 16, and neighbors' neighbors of the central access point 16) has improved compared to (i.e. is less than) the overall BSS color assignment metric in the list compiled in the step of block 46. If the overall BSS color assignment metric has improved, the optimal colors for the central access point 16 and its immediate neighbors are accepted for use in the WLAN deployment 18. If the overall BSS color assignment metric has not improved, the optimal colors for the central access point 16 and its immediate neighbors are rejected and the process continues with the next step.

The processor 24 is operative to check (block 62) if there are more access points 16 in the list compiled in the step of block 46 for which to perform the BSS color assignment metric calculations. If there are more access points 16 in the list for which to perform the BSS color assignment metric calculations (branch 64), a next access point 16 is selected (block 66) from the list and the step of block 50 is repeated for the selected access point 16. The next access point 16 to be selected from the list may be selected based on the access point 16 not currently having an assigned color or not previously being assigned a new color in the step of block 60 since the list was compiled. If there are no more access points 16 in the list for which to perform the BSS color assignment metric calculations (branch 68), the next step in the method is performed. The interface 26 is operative, for each access point 16, to send (block 70) data about the optimal choice BSS color of each access point 16 to that access point 16.

In accordance with an alternative embodiment of the present disclosure, the BSS color of the lowest or highest BSS color assignment metric may not be selected as the optimal choice color, instead, a second highest (or second lowest), or third highest (or third lowest) BSS color assignment metric etc. may be selected for determining the optimal choice color. For example, if the overall BSS color assignment metric (i.e. the sum of the BSS color assignment metrics of the optimal colors) for a set of access points 16 is lower if one or more of the access points is assigned a second BSS color assignment metric etc. instead of the lowest BSS color assignment metric, then the BSS color of the second lowest BSS color assignment metric may be selected for the one or more access points 16.

In practice, some or all of the functions of processor 24 may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. An apparatus comprising:

a processor; and a memory to store data used by the processor, wherein the processor is operative to perform operations including:

(a) selecting a central access point from a plurality of access points in a wireless local area network;

(b) calculating, for each Basic Service Set (BSS) color of a plurality of BSS colors for the central access point, a BSS color assignment metric at least based on use of the BSS color in at least one neighboring BSS neighboring the central access point, yielding a plurality of BSS color assignment metrics for the BSS of the access point;

(c) selecting an optimal BSS color for the central access point based on BSS color metrics calculated for the plurality of BSS colors for the central access point;

(d) calculating BSS color assignment metrics for the plurality of BSS colors of one or more neighboring access points to the central access point;

(e) determining an optimal BSS color for each of the one or more neighboring access points;

(f) based on the optimal BSS color determined for each of the one or more neighboring access points, calculating BSS color assignment metrics for the plurality of BSS colors for one or more further neighboring access points to the one or more neighboring access points to the central access point;

(g) computing an overall BSS color assignment metric for the wireless local area network based on the BSS color metric of the optimal BSS color for the central access point, the BSS color metric of the optimal BSS color for the one or more neighboring access points, and the BSS color metric of the optimal BSS color for the one or more further neighboring access points;

(h) evaluating the overall BSS color assignment metric; and (i) assigning BSS colors to the central access point and to the one or more neighboring access points depending on an outcome of the evaluating.

2. The apparatus according to claim 1, wherein the processor performs (a) selecting by selecting a new central access point from the plurality of access points, and repeating operations (b)-(i) for the new central access point.

3. The apparatus according to claim 1, further comprising an interface to send BSS color assignment data to the plurality of access points based on operation (i) of assigning.

4. The apparatus according to claim 1, wherein the processor performs operation (c) selecting by selecting an optimal BSS color based on a lowest BSS color assignment metric.

5. The apparatus according to claim 1, wherein the processor performs operation (e) determining using a lowest BSS color assignment metric of BSS colors of each of the one or more neighboring access points to select the optimal BSS color for one or more neighbor access points.

6. The apparatus according to claim 1, wherein the processor performs operation (h) evaluating by evaluating if the overall BSS color assignment metric is an improvement compared to an overall BSS color assignment metric for the plurality of access points.

7. The apparatus of claim 6, wherein if the overall BSS color assignment metric is an improvement, the processor further performs accepting optimal BSS colors for the central access point and for its immediate one or more neighbor access points for use in the wireless local area network, and if the overall BSS color assignment metric is not an improvement, the processor performs rejecting optimal BSS colors for the central access point and for its immediate one or more neighbor access points.

8. The apparatus according to claim 1, wherein the processor performs (b) calculating by, for each BSS color of the plurality of BSS colors, calculating the BSS color assignment metric at least based on at least one of:

a BSS load of the at least one neighboring BSS, which is using the BSS color;

a received signal strength indicator (RSSI) or an estimated received signal strength indicator (RSSI) of the at least one neighboring BSS, which is using the BSS color; or whether a channel used by the at least one neighboring BSS, which is using the BSS color, is the same, or different from, a channel used by the BSS of the central access point.

9. A method comprising:

(a) selecting a central access point from a plurality of access points in a wireless local area network;

(b) calculating, for each Basic Service Set (BSS) color of a plurality of BSS colors for the central access point, a BSS color assignment metric at least based on use of the BSS color in at least one neighboring BSS neighboring the central access point, yielding a plurality of BSS color assignment metrics for the BSS of the access point;

(c) selecting an optimal BSS color for the central access point based on BSS color metrics calculated for the plurality of BSS colors for the central access point;

(d) calculating BSS color assignment metrics for the plurality of BSS colors of one or more neighboring access points to the central access point;

(e) determining an optimal BSS color for each of the one or more neighboring access points;

(f) based on the optimal BSS color determined for each of the one or more neighboring access points, calculating BSS color assignment metrics for the plurality of BSS colors for one or more further neighboring access points to the one or more neighboring access points to the central access point;

(g) computing an overall BSS color assignment metric for wireless local area network based on the BSS color metric of the optimal BSS color for the central access point, the BSS color metric of the optimal BSS color for the one or more neighboring access points, and the BSS color metric of the optimal BSS color for the one or more further neighboring access points;

(h) evaluating the overall BSS color assignment metric; and (i) assigning BSS colors to the central access point and to the one or more neighboring access points depending on an outcome of the evaluating.

10. The method of claim 9, wherein (a) selecting includes selecting a new central access point from the plurality of access points, and repeating (b)-(i) for the new central access point.

11. The method of claim 9, wherein (a)-(i) are performing by a network controller in communication with the plurality of access points, and further comprising sending BSS color assignment data to the plurality of access points based on (i) of assigning.

12. The method of claim 9, wherein (c) selecting includes selecting an optimal BSS color based on a lowest BSS color assignment metric.

13. The method of claim 9, wherein (e) determining includes using a lowest BSS color assignment metric of BSS colors of each of the one or more neighboring access points to select the optimal BSS color for one or more neighbor access points.

14. The method of claim 9, wherein (h) evaluating includes evaluating if the overall BSS color assignment metric is an improvement compared to an overall BSS color assignment metric for the plurality of access points.

15. The method of claim 14, wherein if the overall BSS color assignment metric is an improvement, accepting optimal BSS colors for the central access point and for its immediate one or more neighbor access points for use in the wireless local area network, and if the overall BSS color assignment metric is not an improvement, rejecting optimal BSS colors for the central access point and for its immediate one or more neighbor access points.

16. The method according to claim 9, wherein (b) calculating includes, for each BSS color of the plurality of BSS colors, calculating the BSS color assignment metric at least based on at least one of:

a BSS load of the at least one neighboring BSS, which is using the BSS color;

a received signal strength indicator (RSSI) or an estimated received signal strength indicator (RSSI) of the at least one neighboring BSS, which is using the BSS color; or whether a channel used by the at least one neighboring BSS, which is using the BSS color, is the same, or different from, a channel used by the BSS of the central access point.

17. A software product comprising a non-transient computer-readable medium in which program instructions are stored, which instructions, when read by a central processing unit (CPU), cause the CPU to:

(a) selecting a central access point from a plurality of access points in a wireless local area network;

(b) calculating, for each Basic Service Set (BSS) color of a plurality of BSS colors for the central access point, a BSS color assignment metric at least based on use of the BSS color in at least one neighboring BSS neighboring the central access point, yielding a plurality of BSS color assignment metrics for the BSS of the access point;

(c) selecting an optimal BSS color for the central access point based on BSS color metrics calculated for the plurality of BSS colors for the central access point;

(d) calculating BSS color assignment metrics for the plurality of BSS colors of one or more neighboring access points to the central access point;

(e) determining an optimal BSS color for each of the one or more neighboring access points;

(f) based on the optimal BSS color determined for each of the one or more neighboring access points, calculating BSS color assignment metrics for the plurality of BSS colors for one or more further neighboring access points to the one or more neighboring access points to the central access point;

(g) computing an overall BSS color assignment metric for the wireless local area network based on the BSS color metric of the optimal BSS color for the central access point, the BSS color metric of the optimal BSS color for the one or more neighboring access points, and the BSS color metric of the optimal BSS color for the one or more further neighboring access points;

(h) evaluating the overall BSS color assignment metric; and (i) assigning BSS colors to the central access point and to the one or more neighboring access points depending on an outcome of the evaluating.

18. The software product of claim 17, wherein (a) selecting includes selecting a new central access point from the plurality of access points, and repeating (b)-(i) for the new central access point.

19. The software product of claim 17, wherein (h) evaluating includes evaluating if the overall BSS color assignment metric is an improvement compared to an overall BSS color assignment metric for the plurality of access points.

20. The software product of claim 19, wherein if the overall BSS color assignment metric is an improvement, accepting optimal BSS colors for the central access point and for its immediate one or more neighbor access points for use in the wireless local area network, and if the overall BSS color assignment metric is not an improvement, rejecting optimal BSS colors for the central access point and for its immediate one or more neighbor access points.

* * * * *